Feb. 9, 1954 J. J. BOWDEN Re. 23,778
METHOD OF FLUIDIZING SLAG IN THE MANUFACTURE OF STEEL BY OPEN HEARTH AND ELECTRIC FURNACE PROCESSES.
Original Filed Feb. 26, 1949
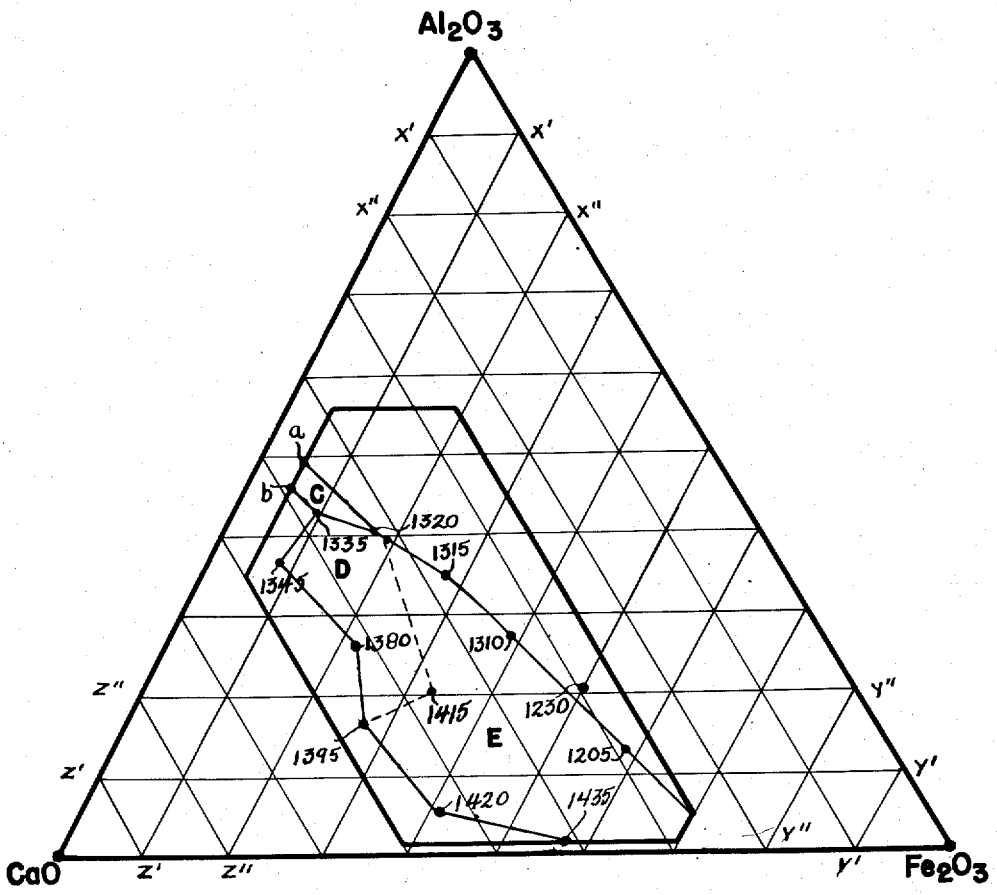
INVENTOR
JAMES J. BOWDEN
BY Paul D. Boone
ATTORNEY Reissued Feb. 9, 1954 Re. 23,778

UNITED STATES PATENT OFFICE 23,778

METHOD OF FLUIDIZING SLAG IN THE MANUFACTURE OF STEEL BY OPEN HEARTH AND ELECTRIC FURNACE PROCESSES

James J. Bowden, Warren, Ohio

Original No. 2,597,851, dated May 27, 1952, Serial No. 78,506, February 26, 1949. Application for reissue June 16, 1953, Serial No. 362,175

10 Claims. (Cl. 75—54)

Matter enclosed in heavy brackets [ ] appears in the original patent but forms no part of this reissue specification; matter printed in italics indicates the additions made by reissue.

This invention relates to the manufacture of iron and steel by the open hearth and electric furnace processes, but more particularly to that part of these processes which relates to the proper conditioning of the slag, which floats upon the molten metal.

It is well known to those skilled in the art in the manufacture of steel by *the open hearth of* the afore-designated processes that in one of the standard methods of operation the furnace is charged with limestone or lime, iron ore, steel scrap and pig iron in that sequence, and that the metallic charge is then melted by the heat of an extraneous fuel such as oil or gas or electricity. And it is also known that when the metal has become molten, the lime, which had been charged on the bottom of the furnace, tends to rise into the slag which is mainly a liquid overlying the steel bath. Iron ore is by no means always employed. Large tonnage of steel is also made by charging limestone, scrap and pig iron in this designated order. Or where burned lime is used the operator charges small amounts of scrap onto the bottom of the furnace, then burned lime, then the balance of the scrap, and finally pig iron. *Since the electric furnace process is conventional, it is not described in detail.*

The constituents of this initial slag in the open hearth process are normally an iron and manganese silicate, but later when sufficient lime comes up into the slag, the principal constituents are dicalcium silicate, calcium aluminoferrites, calcium ferrites, calcium phosphates and free lime; these salts are formed in that sequence.

These slags, through a constantly changing state of oxidation, normally increase their concentration of the iron oxide phase, and simultaneously decrease the concentration of the free lime (CaO) in the slag.

TABLE OF INCIDENCE AND DISPOSITION OF LIME IN THE NORMAL ORDER OF MINERAL FORMATION IN OPEN HEARTH SLAG

| Mineral Formula | Name of Mineral |
|---|---|
| 1. $FeOMnOSiO_2$ | Monticellite—Some MgO present also at times. |
| 2. $2CaOSiO_2$ | Dicalcium silicate. |
| 3. $4CaOFe_2O_3Al_2O_3$ | Tetra calcium alumino ferrite. |
| 4. $2CaOFe_2O_3$ | Dicalcium ferrite. |
| 5. $3CaOP_2O_2$ | Tricalcium phosphate. |
| 6. CaO | Free lime—Present at all times; not formed but is result of calcination of the charged limestone. |

Now, as is also well known in this technological branch of science, the slag as delineated here above is the key to the rate of production of steel ingots, for it is necessary to have a properly conditioned slag to have properly made quality steels. And coincidental with this feature we know that a properly conditioned slag cannot be had until the lime is in solution in the slag; or as mineralogists say, "the slag should be mature" to properly control the manufacture of the steel.

Now as the lime, which is charged on the bottom of the furnace or composes the layer overlying the small amount of scrap on the bottom, is finally released when the metallic charge is melted, the lime, because of its lower specific gravity, rises through the metal and into the iron manganese silicate slag.

The lumps of lime as they go up through this iron manganese silicate slag are coated by the slag therewith. But because of the superior affinity of lime for silica, the manganese and iron in this coating are replaced by the calcium, resulting in a coating of dicalcium silicate ($2CaOSiO_2$) around the lumps of lime floating in the slag bath.

Because of its properties, dicalcium silicate seals off the further calcination or solution of the lime thus encased. The reason for this is that dicalcium silicate has a melting point of 2130° C., which is roughly some 500° C. higher than the operating temperature of the open hearth furnace practice. For the open hearth furnace is made up mainly of silica brick, and such a furnace is only suitable for operation at temperatures not in excess of 1650° C.–1700° C. Hence, some other means than a high temperature alone is necessary to dissolve the limestone or lime, and get it into solution in the slag by reaction, since the furnace structure will not stand up under the temperature necessary to melt dicalcium silicate.

Normally, this is accomplished by the oxidation of the iron in the charge which then combines with the lime in the slag to eventually form dicalcium ferrite ($2CaOFe_2O_3$), which has a melting point of 1430° C. This dicalcium ferrite then reacts with the coating of dicalcium silicate which surrounds the lumps of lime; and by reason of the law of eutectics, it dissolves the coating of dicalcium silicate from around the lumps of lime, after which the remaining lime is again coated with dicalcium silicate from the slag and the process repeated until all the lime is in solution or present as excess uncombined free lime. In the normal practice this waiting for such oxidizing reaction which forms dicalcium ferrite is too slow, so the furnace operator commonly resorts to the use of fluorspar additions to speed up the solubilizing reaction of the lime. The fluorspar, because of its lower melting point (1360° C.) and the law of eutectics, and its other properties, speeds up the fluxing and fluidizing process of the lime. However, fluorspar in some cases is detrimental to the steel quality, unless precisely used, by tending to increase the concentration of FeO in the slag.

The principal object of the present invention is to condition open hearth and electric furnace steel slags containing calcium oxide and calcium silicates, and particularly to fluidizing such slags by adding a mineral having certain percentage relations to each other of CaO, $Al_2O_3$ and $Fe_2O_3$ as explained below and a melting point of 1205–1435° C. to the slag, which has been formed by heating a charge of metallic iron and a source of calcium oxide.

Another object is to decrease the time necessary to fluidize such slags and thus increase the production of steel i. e. tons per furnace hour, as compared with the employment of fluorspar.

A still further object is to make the slag more effective in removing sonims (solid non-metallic impurities or inclusions) from molten steel by more effectively dissolving lime in the slag.

An additional object is to secure a greater ingot yield from the same melted charge than has been attainable when fluorspar has been added to assist. The explanation for this appears below.

One other object is the saving of lime in the charge because of more efficient use, which in turn speeds up production. The lower the lime charge, the faster is the heat time.

Other objects will became obvious or apparent hereinafter from reading the disclosure, more especially with recourse to the accompanying drawing.

For a better understanding of the present invention reference should be made to the accompanying drawing, which depicts a triaxial diagram, the three components of which are, reading clockwise on the triangle, $Al_2O_3$, $Fe_2O_3$ and CaO.

Referring to the drawing, the upper points represent 100% $Al_2O_3$ and each horizontal line (designated x—x, the primes denoting 10% decreases of this component) toward the base a progressive decrease of 10% in the $Al_2O_3$ content. Accordingly, the heavy line parallel to and close to the base of the triangular diagram denotes a content of 1.5% $Al_2O_3$, whereas the heavy line intermediate the fourth and fifth horizontal line denotes 56% $Al_2O_3$.

The lower right apex of the triangular diagram denotes 100% $Fe_2O_3$; and each line y—y (the primes denoting 10% decrease of this component) a progressive decrease of 10% in the $Fe_2O_3$ content. Accordingly, the short heavy line, i. e. the third away from the lower right apex, denotes 70% $Fe_2O_3$, whereas the much longer heavy line paralleling it but further away from that apex and near the left leg of the triangle denotes 5.0% $Fe_2O_3$.

The lower left apex of this triangular diagram denotes 100% CaO; and each line z—z (the primes denoting 10% decrease of this component) a progressive decrease of 10% in the CaO content. Accordingly, the heavy line, the fourth away from the lower left apex, denotes 60% CaO; and the heavy line parallel therewith further away denotes 25% CaO.

These six lines, consisting of the three sets of parallel lines just described form a hexagon which has the following boundaries (reading from top clockwise), expressed in terms of components:

| | |
|---|---|
| 56% $Al_2O_3$ | 1.5% $Al_2O_3$ |
| 25% CaO | 60% CaO |
| 70% $Fe_2O_3$ | 5.0% $Fe_2O_3$ |

The mineral compositions of the present invention fall within the areas identified as E, D, and C in the order of preference recited, each of which areas is within this hexagon.

In accordance with the present invention a mineral, whose components of initial formation are calcium oxide, alumina and iron oxide, combined in accordance with percentages of each which fall within area E, D or C shown in the drawing with the preference in that sequence, and which has been formed by melting these components, is added to the partly formed slag and after the metal in the charge has become liquid due to melting. It is to be understood that the operation to which reference has been made is that of the manufacture of steel by the open hearth or electric furnace processes. The charge, consisting of iron to be converted to steel, iron oxide and limestone or other source of calcium oxide, is heated until the iron has become melted. The iron oxide need not be used except where pig iron is plentiful enough to use in higher percentages. At this stage the slag has lime floating therein, on the surface of which lime particles there is a coating of dicalcium silicate. This last has a very high melting point but its eventual dissolution is necessary. By the addition of tricomponent mineral of the composition indicated, and which is characterized by a low melting point (1205–1435° C.) the high melting point dicalcium silicate (2130° C.) goes into solution, and at a temperature which is well within the range of that held by the slag, i. e. 1500–1700° C. This utilizes the principles and laws of eutectic mixtures.

By adding these minerals to the slag bath as disclosed, it is possible to rapidly flux and combine the dicalcium silicate coating surrounding the lumps of lime as well as fluxing the lime itself. This puts them into solution, thus completing the formation of the slag. There is thus secured a mature slag which is liquid, fluid and by its nature endowed with activity to combine with and remove from the underlying metal the impurities which are deleterious to the quality of the metal itself. This slag is capable of removing such impurities as oxides, silicates *and* sulfides from the molten steel which is thereby refined and brought to the desired end point.

This synthetic mineral additive which functions in the role of accelerating the fluidizing of the slag is formed by intimately mixing the components in the correct proportions, then melting them together. This forms the desired mineral composition, after which the molten mineral is cast, cooled, crushed, and screened to size.

The amount of my preferred composition minerals that will be necessary to add to the slag to facilitate the solution of the lime will vary from one-half pound to ten pounds per ton of steel in the melt. The amount necessary to add will vary; it will depend upon the percentage of lime in the slag, the state of oxidation of the iron, the temperature of the bath and the carbon content of steel scrap being melted, as well as other variables.

The ideal compositions which I prefer to use for manufacture of the mineral for use in the process of this invention are to be found on the drawing in areas E, D and C and indicated in Tables 1 and 2. But for commercial reasons it will not be possible to use pure materials in their manufacture because of the excessive costs of pure materials. Therefore, impurities which are carried in the raw materials that are used will be present in the mixture from which the mineral is made, and the latter will be influenced to that extent by them. Although the commercial raw materials do have components other than alumina, lime and iron oxide, it is these three components and their percentage of relationship to each other as brought out above that is significant. Following the guide above, the preference will be to select compositions approaching those in the guide having the lowest melting point that are possible of attainment with raw materials that are available and economically suitable.

The minerals of the type which have been discussed herein, when introduced into the open hearth or electric furnace slag systems, will first melt and then unite with one or more of the components that are present in the slag, namely the silicates of lime, the oxides of lime, calcium ferrites, calcium alumino ferrites, by reason of the low melting points of the added mineral. And, as in accordance with the law of eutectic mixtures, they will form a product of even lower melting point. These two accomplishments will speed up the reaction of putting the undissolved lime and calcium components into the fluid state in the slag.

Tetra calcium alumino ferrite $$(4CaOAl_2O_3Fe_2O_3)$$

and dicalcium ferrite ($2CaOFe_2O_3$) form a complete series of solid solutions; area E in the drawing is composed of them. This is also true for tetra calcium aluminoferrite with penta calcium tri aluminate ($5CaO3Al_2O_3$); area C in the drawing is so composed. An eutectic mixture with a specimen composition of 47% lime, 43% alumina and 10% iron oxide, which melts at 1335° C., forms a solid solution. Calcium aluminate $$(CaOAl_2O_3)$$

takes up about 15% calcium ferrite ($CaOFe_2O_3$) in solid solution and the latter takes up about 10% of the former in solid solution. A composition of 28% CaO, 13% $Al_2O_3$ and 59% $Fe_2O_3$ melts approximately at 1205° C.

The following table shows the crystalline phases having quadruple and quintuple points together with their approximate analyses and melting points:

TABLE 1.—QUADRUPLE AND QUINTUPLE POINTS IN THE SYSTEM $CaO—Al_2O_3—Fe_2O_3$

| Crystalline phases | Composition weight percentage | | | |
|---|---|---|---|---|
| | CaO | $Al_2O_3$ | $Fe_2O_3$ | Temp., ° C. |
| QUADRUPLE POINTS | | | | |
| CaO, $4CaOAl_2O_3Fe_2O_3$ | 56 | 17 | 26 | 1395±5 |
| CaO, solid solutions of $4CaOAl_2O_3Fe_2O_3+2CaOFe_2O_3$ | 41.5 | 1.5 | 57.0 | 1435±5 |
| $4CaOAl_2O_3Fe_2O_3$ | 46.1 | 21.0 | 32.9 | 1415±5 |

| QUINTUPLE POINTS | | | | |
|---|---|---|---|---|
| CaO, $3CaOAl_2O_3$, $4CaOAl_2O_3Fe_2O_3$ | 54 | 37 | 9 | 1345±5 |
| $3CaOAl_2O_3$, $4CaOAl_2O_3Fe_2O_3$, $5CaO3Al_2O_3$ | 47 | 43 | 10 | 1335±5 |
| $4CaOAl_2O_3Fe_2O_3$, $5CaO3Al_2O_3$, solid solutions of $CaOAl_2O_3+CaOFe_2O_3$ | 42 | 40 | 18 | 1320±5 |
| Solid solutions of $4CaOAl_2O_3Fe_2O_3+2CaOFe_2O_3$, $CaOAl_2O_3+CaOFe_2O_3$, $CaOFe_2O_3+CaOAl_2O_3$ | 28 | 13 | 59 | 1205±5 |

TABLE 2.—PREFERRED COMPOSITIONS AND THEIR M. P.

| Point # | Composition | | | Melts Approx. |
|---|---|---|---|---|
| | CaO | $Al_2O_3$ | $Fe_2O_3$ | |
| 1 | 28 | 13 | 59 | 1,205 |
| 2 | 30 | 10 | 60 | 1,215 |
| 3 | 30 | 20 | 50 | 1,233 |
| 4 | 31 | 23 | 46 | 1,275 |
| 5 | 33 | 17 | 50 | 1,275 |
| 6 | 34 | 27 | 39 | 1,310 |
| 7 | 38 | 23 | 39 | 1,315 |
| 8 | 38 | 36 | 26 | 1,315 |
| 9 | 42 | 41 | 17 | 1,320 |
| 10 | 42 | 40 | 18 | 1,320 |
| 11 | 40 | 30 | 30 | 1,330 |
| 12 | 47 | 43 | 10 | 1,335 |
| 13 | 36 | 56 | 8 | 1,335 |
| 14 | 42 | 38 | 20 | 1,340 |
| 15 | 55 | 36 | 9 | 1,345 |
| 16 | 56 | 35 | 9 | 1,354 |
| 17 | 52 | 32 | 16 | 1,370 |
| 18 | 43 | 34 | 23 | 1,370 |
| 19 | 52 | 26 | 22 | 1,380 |
| 20 | 46 | 27 | 27 | 1,385 |
| 21 | 57 | 17 | 26 | 1,395 |
| 22 | 47 | 48 | 5 | 1,395 |
| 23 | 55 | 11 | 34 | 1,400 |
| 24 | 46 | 21 | 33 | 1,415 |
| 25 | 53 | 6 | 41 | 1,420 |
| 26 | 41.5 | 1.5 | 57.0 | 1,435 |

Within area E are the solid solutions of tetra calcium aluminoferrite [$(4CaO—Al_2O_3—Fe_2O_3)$] ($4CaOAl_2O_3Fe_2O_3$) and calcium ferrites including dicalcium ferrite ($2CaOFe_2O_3$).

Area E is defined as the polygon within the hexagon bounded by these series of points, expressed in terms of the components CaO, $Al_2O_3$, and $Fe_2O_3$ (reading clockwise from its topmost point):

| | | |
|---|---|---|
| 42% CaO | 40% $Al_2O_3$ | 18% $Fe_2O_3$ |
| 38% CaO | 36% $Al_2O_3$ | 26% $Fe_2O_3$ |
| 34% CaO | 27% $Al_2O_3$ | 39% $Fe_2O_3$ |
| 25% CaO | 5% $Al_2O_3$ | 70% $Fe_2O_3$ |
| 28.5% CaO | 1.5% $Al_2O_3$ | 70% $Fe_2O_3$ |
| 41.5% CaO | 1.5% $Al_2O_3$ | 57% $Fe_2O_3$ |
| 53% CaO | 6% $Al_2O_3$ | 41% $Fe_2O_3$ |
| 57% CaO | 17% $Al_2O_3$ | 26% $Fe_2O_3$ |
| 46% CaO | 21% $Al_2O_3$ | 33% $Fe_2O_3$ |

Area D is defined as the irregular six sided polygon, bounded by these six points (starting at the uppermost point and reading clockwise):

| | | |
|---|---|---|
| 47% CaO | 43% $Al_2O_3$ | 10% $Fe_2O_3$ |
| 42% CaO | 40% $Al_2O_3$ | 18% $Fe_2O_3$ |
| 46% CaO | 21% $Al_2O_3$ | 33% $Fe_2O_3$ |
| 57% CaO | 17% $Al_2O_3$ | 26% $Fe_2O_3$ |
| 52% CaO | 27% $Al_2O_3$ | 21% $Fe_2O_3$ |
| 54% CaO | 37% $Al_2O_3$ | 9% $Fe_2O_3$ |

Area C is defined as a four sided figure bounded by these points (starting at the uppermost point "a"):

| | | |
|---|---|---|
| 45% CaO | 50% $Al_2O_3$ | 5% $Fe_2O_3$ |
| 42% CaO | 40% $Al_2O_3$ | 18% $Fe_2O_3$ |
| 47% CaO | 43% $Al_2O_3$ | 10% $Fe_2O_3$ |
| 49% CaO | 46% $Al_2O_3$ | 5% $Fe_2O_3$ |

The constituents of minerals within or substantially within the areas E, D and C, by weight percentages of CaO, $Al_2O_3$, and $Fe_2O_3$, the corresponding point numbers and approximate melting points are to be found set out in Table 2.

Within the preferred area E, or the less preferred areas D and C, I naturally favor the selection of minerals having lower melting points, although for reasons of economy or otherwise, I may use minerals the composition of which falls anywhere within or substantially within the respective areas.

In the disclosure, supra, the additive for fluidizing and maturing the slag is a synthetic mineral which has been formed by mixing CaO, $Al_2O_3$ and $Fe_2O_3$ in proper proportion, melting, cooling, crushing and sizing. However, the additive may be formed by simply sintering this mixture, cooling and sizing the product. Sizing may not even be necessary. By sintering is meant converting the pulverized components into a continuous mass by heating to a temperature considerably below fusion; union between the particles results from surface cohesion—no fusion is involved.

That my invention will be more fully understood, the more detailed practice thereof is illustrated by the following example:

EXAMPLE

The furnace (open hearth or electric) is charged with limestone, steel scrap and pig iron. It may or may not contain iron oxide ore. The charge is melted using any suitable heat source—oil, gas or electricity. When lime has risen up into the slag or is coming up into it, one of the preferred minerals in a uniform, pulverized condition is added and well incorporated therein. That composition containing 13% $Al_2O_3$, 28% CaO and 59% $Fe_2O_3$, and having a M. P. of 1205° C. is one of the best.

When added mineral melts it combines with the dicalcium silicate coating on the lumps of lime floating in the slag, putting it in solution, and also with the free lime. In this manner speeding up of the solution of the lime is accomplished.

The use of synthetic minerals of areas E, D and C in the drawing and of predetermined melting points within the range substantially 1205–1435° C. possesses advantages not to be secured by using fluorspar in conditioning open hearth and electric furnace steel slags. When fluorspar is used to thin the slag, the formation of dicalcium ferrite in the slag is enhanced, which dicalcium ferrite will dissociate giving off FeO. But when alumina-containing minerals such as I propose to use are added, tetra calcium aluminoferrite is formed in the slag, and in contrast it does not dissociate to give up oxygen as an oxide of iron. This means that there is a somewhat lower content of FeO in the slag; in consequence there is more iron in the bath when FeO in the slag is lower.

There has been pointed out supra that, in addition to an increased ingot yield for the reason just explained, there may be a saving of lime charged. There is a lower lime charge necessary on the basis of the same iron constituents and weights. There is faster heat time because of the more efficient use of lime. To illustrate, on the basis of tapping 100 tons, increasing the limestone charge 1% would lengthen the time by approximately one hour.

It is apparent that many widely different embodiments of this invention may be made without departing from the spirit and scope thereof. Therefore it is not intended that the invention be limited except as indicated in the appended claims. The abbreviation "M. P." has its customary meaning of melting point. In the claims the term "mineral" embraces preferably the preformed product formed by melting, cooling and crushing, but also is intended to cover the product formed by sintering. In the claims the term "calcium oxide" has been used in reference to a component in the formation of the slag. It is intended, of course, to embrace calcium carbonate and other precursors of calcium oxide, such concept being clear from the specification.

I claim:

1. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in the area of the accompanying drawing bounded substantially by the following points:

| | | |
|---|---|---|
| 45% CaO | 50% $Al_2O_3$ | 5% $Fe_2O_3$ |
| 42% CaO | 40% $Al_2O_3$ | 18% $Fe_2O_3$ |
| 38% CaO | 36% $Al_2O_3$ | 26% $Fe_2O_3$ |
| 34% CaO | 27% $Al_2O_3$ | 39% $Fe_2O_3$ |
| 25% CaO | 5% $Al_2O_3$ | 70% $Fe_2O_3$ |
| 28.5% CaO | 1.5% $Al_2O_3$ | 70% $Fe_2O_3$ |
| 41.5% CaO | 1.5% $Al_2O_3$ | 57% $Fe_2O_3$ |
| 53% CaO | 6% $Al_2O_3$ | 41% $Fe_2O_3$ |
| 57% CaO | 17% $Al_2O_3$ | 26% $Fe_2O_3$ |
| 52% CaO | 26% $Al_2O_3$ | 22% $Fe_2O_3$ |
| 55% CaO | 36% $Al_2O_3$ | 9% $Fe_2O_3$ |
| 47% CaO | 43% $Al_2O_3$ | 10% $Fe_2O_3$ |
| 49% CaO | 46% $Al_2O_3$ | 5% $Fe_2O_3$ |

which slag has been formed by heating a charge of metallic iron to be converted and calcium oxide, employing substantially one-half to ten pounds of the aforesaid mineral per ton of total iron melted, the temperature of the furnace being above *the* M. P. of the charge and still further above the M. P. of the aforesaid mineral but below the M. P. of dicalcium silicate, the addition of the mineral fluidizing the slag by melting of the mineral which then combines with components of the slag.

2. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area C of the accompanying drawing, which slag has been formed by heating a charge of metallic iron to be converted and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

3. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area D of the accompanying drawing, which slag has been formed by heating a charge of metallic iron to be converted and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

4. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area E of the accompanying drawing, which slag has been formed by heating a charge of metallic iron to be converted and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

5. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area E of the accompanying drawing, which slag has been formed by heating a charge of metallic iron and iron oxide ore to be converted, and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

6. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area D of the accompanying drawing, which slag has been formed by heating a charge of metallic iron and iron oxide ore to be converted, and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

7. The method of conditioning open hearth and electric furnace slags in steel manufacture, which slags contain dicalcium silicate and free lime, comprising the steps of adding to the slag a mineral having a M. P. of substantially 1205–1435° C. and whose components of initial formation were lime, alumina and iron oxide, and having the percentage relation to each other as shown in area C of the accompanying drawing, which slag has been formed by heating a charge of metallic iron and iron oxide ore to be converted, and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

8. The method of conditioning open hearth and electric furnace slags in steel manufacture, which slags contain a dicalcium silicate and free lime, comprising the steps of adding to the slag a mineral having a M. P. of substantially 1205–1435° C. and whose components of initial formation were lime, alumina and iron oxide, and having the percentage relation to each other as shown in the area of the accompanying drawing bounded substantially by the following points:

| | | |
|---|---|---|
| 45% CaO | 50% $Al_2O_3$ | 5% $Fe_2O_3$ |
| 42% CaO | 40% $Al_2O_3$ | 18% $Fe_2O_3$ |
| 38% CaO | 36% $Al_2O_3$ | 26% $Fe_2O_3$ |
| 34% CaO | 27% $Al_2O_3$ | 39% $Fe_2O_3$ |
| 25% CaO | 5% $Al_2O_3$ | 70% $Fe_2O_3$ |
| 28.5% CaO | 1.5% $Al_2O_3$ | 70% $Fe_2O_3$ |
| 41.5% CaO | 1.5% $Al_2O_3$ | 57% $Fe_2O_3$ |
| 53% CaO | 6% $Al_2O_3$ | 41% $Fe_2O_3$ |
| 57% CaO | 17% $Al_2O_3$ | 26% $Fe_2O_3$ |
| 52% CaO | 26% $Al_2O_3$ | 22% $Fe_2O_3$ |
| 55% CaO | 36% $Al_2O_3$ | 9% $Fe_2O_3$ |
| 47% CaO | 43% $Al_2O_3$ | 10% $Fe_2O_3$ |
| 49% CaO | 46% $Al_2O_3$ | 5% $Fe_2O_3$ |

which slag has been formed by heating a charge of metallic iron and iron oxide ore to be converted, and calcium oxide, employing substantially one-half of ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

9. The method of conditioning open hearth and electric furnace slags in steel manufacture, which slags contain a calcium silicate and free lime, comprising the steps of adding to the slag, a mineral having an M. P. of substantially 1205–1435° C., whose components of initial formation were lime, alumina and iron oxide, and having the percentage relation to each other as shown in area E of the accompanying drawing, which slag has been formed by heating a charge of metallic iron to be converted and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

10. The method of conditioning open hearth and electric furnace slags in steel manufacture, which slags contain a calcium silicate and free lime, comprising the steps of adding to the slag a mineral having an M. P. of substantially 1205–1435° C., whose components of initial formation were lime, alumina and iron oxide, and having the percentage relation to each other as shown in the area of the accompanying drawing bounded substantially by the following points:

| | | |
|---|---|---|
| 45% CaO | 50% $Al_2O_3$ | 5% $Fe_2O_3$ |
| 42% CaO | 40% $Al_2O_3$ | 18% $Fe_2O_3$ |
| 38% CaO | 36% $Al_2O_3$ | 26% $Fe_2O_3$ |
| 34% CaO | 27% $Al_2O_3$ | 39% $Fe_2O_3$ |
| 25% CaO | 5% $Al_2O_3$ | 70% $Fe_2O_3$ |
| 28.5% CaO | 1.5% $Al_2O_3$ | 70% $Fe_2O_3$ |
| 41.5% CaO | 1.5% $Al_2O_3$ | 57% $Fe_2O_3$ |
| 53% CaO | 6% $Al_2O_3$ | 41% $Fe_2O_3$ |
| 57% CaO | 17% $Al_2O_3$ | 26% $Fe_2O_3$ |
| 52% CaO | 26% $Al_2O_3$ | 22% $Fe_2O_3$ |
| 55% CaO | 36% $Al_2O_3$ | 9% $Fe_2O_3$ |
| 47% CaO | 43% $Al_2O_3$ | 10% $Fe_2O_3$ |
| 49% CaO | 46% $Al_2O_3$ | 5% $Fe_2O_3$ |

which slag has been formed from a charge of metallic iron to be converted and calcium oxide, employing substantially one-half to ten pounds of the aforesaid mineral per ton of total iron melted, the temperature of the furnace being above the M. P. of the charge and still further above the M. P. of the aforesaid mineral but below the M. P. of dicalcium silicate, the addition of the mineral fluidizing the slag by melting of the mineral which then combines with components of the slag.

JAMES J. BOWDEN.

References Cited in the file of this patent or the original patent

UNITED STATES PATENTS

| Number | Name | Date |
|---|---|---|
| 687,029 | Hughs | Nov. 19, 1901 |
| 1,890,485 | Amsler | Dec. 13, 1932 |
| 2,159,977 | Nicholas | May 30, 1939 |
| 2,198,625 | Koppers | Apr. 30, 1940 |
| 2,283,622 | Bowden et al. | May 19, 1942 |

FOREIGN PATENTS

| Number | Country | Date |
|---|---|---|
| 4,642 | Great Britain | of 1877 |
| 4,625 | Great Britain | of 1879 |
| 535,245 | Great Britain | Apr. 2, 1941 |

OTHER REFERENCES

Open Hearth Proceedings of 1946, pages 47 to 56. Published by the A. I. M. E., New York, N. Y.

Open Hearth Proceedings of 1948, pages 194 to 205. Published by the A. I. M. E., New York, N. Y.

Journal of the American Chemical Society, vol. 50, pages 396 to 406. Published in 1928 by the Society at Easton, Pa.